(12) United States Patent
Hsieh et al.

(10) Patent No.: US 9,557,791 B2
(45) Date of Patent: Jan. 31, 2017

(54) COMPUTER DEVICE AND METHOD FOR CONVERTING WORKING MODE OF UNIVERSAL SERIAL BUS CONNECTOR OF THE COMPUTER DEVICE

(75) Inventors: Chang-Yu Hsieh, Taipei (TW); Pai-ching Huang, Taipei (TW); Li Chien Wu, Taipei (TW)

(73) Assignees: ASUS TECHNOLOGY (SUZHOU) CO., LTD., Jiangsu (CN); ASUSTEK COMPUTER INC., Taipei (TW)

( * ) Notice: Subject to any disclaimer, the term of this patent is extended or adjusted under 35 U.S.C. 154(b) by 305 days.

(21) Appl. No.: 14/381,964

(22) PCT Filed: Feb. 29, 2012

(86) PCT No.: PCT/CN2012/071765
§ 371 (c)(1),
(2), (4) Date: Dec. 3, 2014

(87) PCT Pub. No.: WO2013/127071
PCT Pub. Date: Sep. 6, 2013

(65) Prior Publication Data
US 2015/0082056 A1 Mar. 19, 2015

(51) Int. Cl.
*G06F 1/26* (2006.01)
(52) U.S. Cl.
CPC ..................... *G06F 1/266* (2013.01)
(58) Field of Classification Search
None
See application file for complete search history.

(56) References Cited

U.S. PATENT DOCUMENTS 6,738,834 B1 * 5/2004 Williams ............ G06F 13/4072
710/10
2008/0301331 A1 12/2008 Hou et al.
(Continued)

FOREIGN PATENT DOCUMENTS

| CN | 1723557 | 1/2006 |
| CN | 1774835 | 5/2006 |

(Continued)

OTHER PUBLICATIONS

International Search Report and Written Opinion for PCT/CN2012/071765 dated, Nov. 8, 2012.
(Continued)

*Primary Examiner* — Paul Yanchus, III
(74) *Attorney, Agent, or Firm* — Bryan Cave LLP

(57) ABSTRACT

A computer device and a method for converting a working mode of a universal serial bus (USB) connector of the computer device. The computer device comprises a USB connector, a power interruption unit, a first switch unit, a south bridge chip, a reading unit, a control unit, and a charging control unit. The USB connector is linked to an external USB device. When a fast charging instruction is received, the power interruption unit interrupts the power supply of the USB connector; the first switch unit performs switching, so that the USB connector works in a fast charging mode. When the control unit receives a common charging instruction, the power interruption unit interrupts the power supply of the USB connector; the first switch unit performs switching, so that the USB connector works in a common charging mode, and data transmission can be performed.

22 Claims, 6 Drawing Sheets

(56) References Cited

U.S. PATENT DOCUMENTS

| | | | |
|---|---|---|---|
| 2011/0060898 A1 | 3/2011 | Huang et al. | |
| 2011/0113181 A1 | 5/2011 | Piwonka et al. | |
| 2011/0161694 A1 | 6/2011 | Fujiwara | |
| 2011/0179211 A1 | 7/2011 | Li et al. | |
| 2013/0007430 A1* | 1/2013 | Fan | G06F 9/445 713/1 |
| 2013/0162198 A1* | 6/2013 | Yokota | H02J 7/007 320/107 |

FOREIGN PATENT DOCUMENTS

| | | |
|---|---|---|
| CN | 201038541 | 3/2008 |
| CN | 201072838 | 6/2008 |
| CN | 101430592 | 5/2009 |
| CN | 101546918 | 9/2009 |
| CN | 101841107 | 9/2010 |
| CN | 101894054 | 11/2010 |
| CN | 101997253 | 3/2011 |
| CN | 102156524 | 8/2011 |
| EP | 0195520 | 9/1986 |
| JP | 2011034601 | 2/2011 |
| WO | 2008-083167 | 7/2008 |

OTHER PUBLICATIONS

International Search Report and Written Opinion for PCT/CN2012/070577 dated, Aug. 20, 2012.
Supplementary partial European Search Report, EP 12 86 9789, dated Sep. 15, 2015.

* cited by examiner

COMPUTER DEVICE AND METHOD FOR CONVERTING WORKING MODE OF UNIVERSAL SERIAL BUS CONNECTOR OF THE COMPUTER DEVICE

CROSS-REFERENCE TO RELATED APPLICATIONS

This application is a national stage application under 35 U.S.C. 371 of and claims priority to International Application No. PCT/CN2012/071765, filed Feb. 29, 2012. International Application No. PCT/CN2012/0071765 is incorporated herein by reference.

BACKGROUND OF THE INVENTION

Technical Field

The disclosure relates to a computer device and, more particularly, to a computer device with a universal serial bus (USB) connector.

Background

As the development of the technology, various portable electronic devices that utilize universal serial bus (USB) are more common recently, which are convenient and necessary for users. In particular, the conventional computer device connects to external devices through USB transmission wire to provide expanding functions for users.

For example, when a smart phone is connected to a notebook computer through a transmission wire, the notebook computer can charge the smart phone in a general charging mode or communicate with the smart phone. The communication includes data exchange such as music, photos or address lists and so on. In addition, the notebook computer can charge the smart phone through a USB connector in a general charging mode or a quick charging mode. The two charging modes have different value of the charging current flow. The charging current flow of the general charging mode is about 500 milliampere (mA), and charging current flow of the quick charging mode is about 1 to 2 ampere (A). In other words, the quick charging mode has a quicker charging speed and shorter charging time.

However, to switch the USB connector from a general charging mode to a quick charging mode, the user has to disconnect the connection by removing the USB transmission wire that connected between the smart phone and the notebook computer, and then re-connect them again by insert the USB wire therebetween, thus to switch the USB connector to a quick charging mode. However, the manually connecting and disconnecting operations are rather annoying and inconvenient for users.

BRIEF DESCRIPTION OF THE DRAWINGS

FIG. 5 (b) is a schematic diagram showing that a security access mechanism is released from a BIOS image file in an embodiment.

DESCRIPTION OF THE EMBODIMENTS

Figure 1:
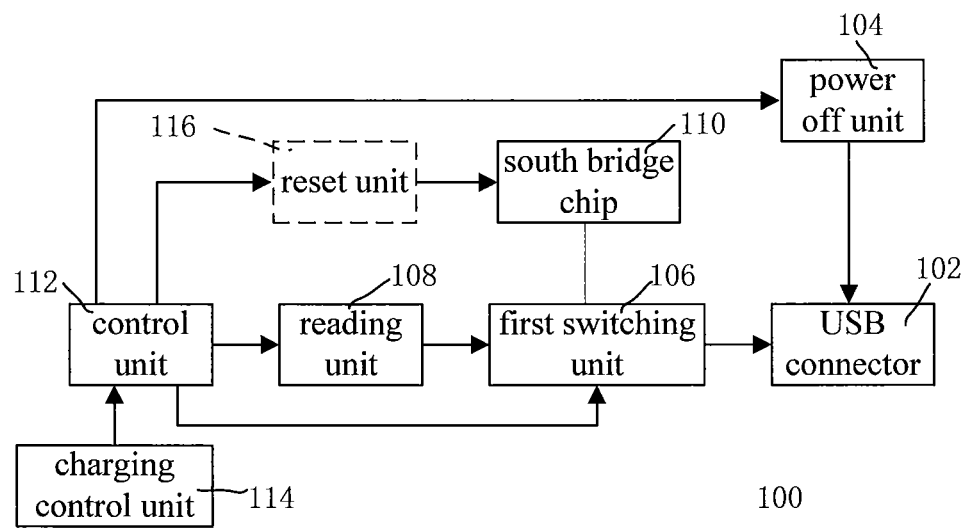
FIG. 1 is a block diagram showing a computer device in a first embodiment.

A computer device is provided, when the computer device is in power on state, a USB device can be switched between a quick charging mode and a general charging mode without manually connecting an external USB device by plugging in and out a USB connector of the computer device.

A method of switching operation modes of a universal serial bus (USB) connector adapted to a computer device is provided. When the computer device is a power off state, the computer can update a Basic Input Output System (BIOS) directly via an external USB device or switching the operation mode to a quick charging mode to charge the external USB device. When the control unit receives a quick charging command, the power off unit cuts off the USB connector and makes the USB connector operate at a quick charging mode by switching the first switching unit; when the control unit receives a general charging command, the power off unit cuts off the USB connector and makes the USB connector operate at a general charging mode by switching the first switching unit.

A computer device is provided herein, and it includes a USB connector, a power off unit, a first switching unit, a south bridge chip, a reading unit, a control unit and a charging control unit. The USB connector connected to an external USB device which can be operated at a general charging mode or a quick charging mode. The power off unit is connected to the USB connector. The first switching unit connected to the USB connector which switches between the south bridge chip and the reading unit. The control unit is connected to the power off unit, the first switching unit, the south bridge chip and the reading unit, and it is used for transmitting a control signal. The charging control unit is connected to the control unit. When the external USB device is connected to the USB connector, the USB connector operates at a general charging mode. When the charging control unit receives a quick charging command, the charging control unit transmits a control signal of a quick charging mode to the control unit. The control unit controls the power off unit to cut off the USB connector and controls the first switching unit to switch from the south bridge chip to the reading unit, thus, the computer device can charge the external USB device in a quick charging mode via the USB connector when the external USB device is connected to the reading unit.

In an embodiment, when the charging control unit receives a general charging command, the charging control unit transmits a control signal to switch the computer device from a general charging mode to the control unit. The control unit controls the power off unit to cut off the power to the USB connector and controls the first switching unit to switch back to the south bridge chip, which controls the computer device to charge the USB device in a general mode or to transfer data to the USB device.

In an embodiment, when the computer device is in a power on state, the charging control unit receives a quick charging command that triggered via a user interface, and the computer device is switched from a general charging mode to a quick charging mode. The charging control unit further receives a default power off command from the user interface, and the default power off command makes the computer device enter a power off state and automatically switch to the quick charging mode.

In an embodiment, the first switching unit is a USB switching unit which is connected to the south bridge chip or the reading unit via the USB interface.

In an embodiment, the computer device further includes a backup trigger unit, a delay unit and a second switching unit. The delay unit is connected to the control unit. The backup trigger unit is connected to the control unit and used for receiving a backup trigger signal. The second switching unit is connected to the memory unit and is used for switching between the south bridge chip and the control unit. After the backup trigger unit receives a backup trigger signal of starting a BIOS updating mode, the control unit controls the power off unit to cut off the power to the USB connector and controls the second switching unit to switch from the south bridge chip to the control unit. The delay unit delays the reading time of the reading unit reading the external USB device, and the reading unit reads a BIOS image file stored in the external USB device to update the BIOS stored in the memory unit after the delay time is up.

In an embodiment, the computer device further includes a data storage unit connected to the control unit which is used for storing the software/hardware information relating to the computer device. After the reading unit reads the BIOS image file stored in the external USB device, the control unit compares the BIOS image file with the software/hardware information stored in the data storage unit and the BIOS information stored in the memory unit, and determines whether the BIOS image files an updatable version for the computer device.

In an embodiment, the control unit determines whether the BIOS image file includes a security access mechanism. When the BIOS image file includes a security access mechanism, the control unit decodes the BIOS image file to release the security access mechanism, and the BIOS is updated according to the BIOS image file of which the security access mechanism is released.

In an embodiment, the second switching unit is a Serial Peripheral Interface (SPI) switching unit which is connected to the south bridge chip or the control unit through the SPI.

In an embodiment, the computer device further includes a display unit. The display unit connected to the control unit displays charging information while charging process or displays update information of the BIOS during an updating process.

A method of switching operation modes of a USB connector adapted to a computer device is provided. The computer device includes a USB connector, a first switching unit connected to the USB connector and a second switching unit connected to a memory unit. The USB connector is connected to an external USB device with a USB interface. The first switching unit switches between a south bridge chip and a reading unit. The second switching unit switches between the south bridge chip and the control unit. The method of switching operation modes includes following steps: receiving a backup trigger signal of starting a BIOS updating mode; cutting off the USB connector to initialize a state setting value of the external USB device, and resetting the south bridge chip of the computer device; delaying a reading time of reading internal information of the external USB device; waiting a delay time after switching the first switching unit connected to the south bridge chip to the reading unit and switching the second switching unit connected to the south bridge chip to the control unit; determining whether a notification signal of the delay time is up is received; reading a BIOS image file stored in the external USB device by the reading unit and determines whether the BIOS image file is an updatable version for the computer device when the notification signal is received; and updating a BIOS stored in the memory unit.

In an embodiment, the computer device further includes a data storage unit connected to the control unit, which is used for storing the software/hardware information relating to the computer device. The method of determining whether the BIOS image file is the updatable version for the computer device includes that comparing the BIOS image file with the software/hardware information stored in the data storage unit and the BIOS stored in the memory unit to determine whether the BIOS image file is the updatable version for the computer device.

In an embodiment, the method of switching operation modes further includes a step to determine whether the BIOS image file includes a security access mechanism. The BIOS will be updated via the BIOS image file directly when the BIOS image file does not include a security access mechanism. When the BIOS image file includes a security access mechanism, the BIOS image file is decoded to release the security access mechanism and updating the BIOS via the BIOS image file of which the security access mechanism is released.

In an embodiment, the computer device further includes a display unit. The method of switching operation modes further includes that displaying relating updating information on the display unit during updating the BIOS.

Another method of switching operation modes of a USB connector adapted to a computer device is provided. The computer device includes a USB connector connected to an external USB device. The method of switching operation modes includes following steps: receiving a default power off command when the computer device is in a power on state, the default power off command makes the computer device enter a power off state and automatically switch to a quick charging mode; detecting a backup trigger signal used for starting a BIOS updating mode when the computer device is switched to the quick charging mode; determining whether the external USB device connected to the USB connector includes a BIOS image file; and updating a BIOS of the computer device according to the BIOS image file when the external USB device includes a BIOS image file.

In an embodiment, the computer device receives the default power off command from a user interface.

In an embodiment, the operation mode switching method of the computer device further includes: determining whether the BIOS image file stored in the external USB device includes a security access mechanism, updating the BIOS via the BIOS image file directly when the BIOS image file does not comprise a security access mechanism; decoding the BIOS image file to release the security access mechanism and updating the BIOS via the BIOS image file of which the security access mechanism is released when the BIOS image file comprises a security access mechanism.

In an embodiment, the method of switching operation modes further includes: determining whether the BIOS of the computer device updates successfully, cutting off the USB connector to initialize a state setting value of the external USB device when the BIOS of the computer device updates successfully, and recovering the computer device to the quick charging mode to quickly charge the external USB device.

In conclusion, the computer device and the method of switching operation modes of the computer are provided herein, a switching between a quick charging mode and a general charging mode is achieved through a cutting down time controlled by a power off unit instead of plugging in and out manually between the computer device and the external USB device. In additional, it also provides a function of updating via a BIOS image file with a security access mechanism in the present disclosure. Furthermore, a switch between a BIOS updating mode and a quick charging mode can be achieved even if the computer device is in a power off state.

In the following embodiments, the power management state of the computer device includes six states S0 to S5 which defined by a specification of Advanced Configuration and Power Interface (ACPI), wherein S0 denotes the power on state and the S5 denotes the power off state, which is not limited herein.

FIG. 1 is a block diagram showing a computer device in a first embodiment. As shown in FIG. 1, the computer device 100 can be a desktop computer, a notebook computer, a workstation or a server, which is not limited herein. In the first embodiment, the computer device 100 includes a Universal Serial Bus (USB) connector 102, a power off unit 104, a first switching unit 106, a reading unit 108, a south bridge chip 110, a control unit 112 and a charging control unit 114.

The USB connector 102 is used to connect to an external USB device with a USB interface. The USB interface can be a standard USB interface, a Mini USB interface or a Micro USB interface, which is not limited herein. The external USB device can be a flash drive, a phone, a smart phone, a tablet computer or an e-book, which is not limited herein. In the embodiment, USB 2.0, USB 3.0 or other data transmission protocols can be applied, which is not limited herein.

The first switching unit 106 is connected to the USB connector 102, and the first switching unit 106 is used to switch between the south bridge chip 110 and the reading unit 108. The first switching unit may be a USB switching unit which is connected to the south bridge chip 110 or the reading unit 108 through a USB interface.

The control unit 112 may be an Application Specific Integrated Circuit (ASIC) which is connected and transmits a control signal to the power off unit 104, the first switching unit 106, the south bridge chip 110 and the reading unit 108, respectively, and the control unit 112 is used to transmit a control signal to these components.

The charging control unit 114 is connected to the control unit 112, it is used to control the operation mode (such as a general charging mode or a quick charging mode) of the USB connector 102. The charging control unit 114 informs the control unit 112 to send a control signal to the power off unit 104, so as to make the power off unit 104 send a power off command to the USB connector 102 and set a power off time of the USB connector 102.

In the embodiment, when the USB connector 102 is connected to the external USB device, in the beginning default state, the USB connector 102 operates at the general charging mode, and the charging current from the USB connector 102 to the external USB device is about 0.5 ampere (A). In addition, the computer device 100 can transmit the data to the external USB device through the USB connector 102 when the computer device 100 is in the general charging mode.

When a quick charging mode is needed to charge the external USB device through the USB connector 102, the operation mode can be switched to a quick charging mode via a switch or a software application in the computer device 100. When the USB connector 102 is switched to a quick charging mode, the charging control unit 114 receives a quick charging command, and then the charging control unit 114 sends a control signal of switching the USB connector 102 to a quick charging mode to the control unit 112. After the control unit 112 receives the control signal of switching to the quick charging mode, the control unit 112 sends a power off command to the power off unit 104 and sets a power off time. Thus, the connection between the USB connector 102 and the external USB device is cut off, and the external USB device is connected to the USB connector 102 again after the power off time. Furthermore, the control unit 112 controls the first switching unit 106 to switch from the south bridge chip 110 to the reading unit 108 to reconnect the external USB device and the USB connector 102. After the reconnection, the operation mode of the USB connector is switched from the original general charging mode to the quick charging mode. Hence, the external USB device and the first switching unit 106 are connected to the reading unit 108. The control unit 112 can charge the external USB device in a quick charge mode via the reading unit 108, the first switching unit 106 and the USB connector 102. At the time, the charging current from the USB connector 102 to the external USB device is about 1 ampere to 2 ampere, which is not limited herein.

On the other hand, when the charging control unit 114 receives a command of switching to a general charging mode while the USB connector operates at a quick charging mode, the charging control unit 114 sends a control signal of switching the USB connector to a general charging mode to the control unit 112. After the control unit 112 receives the control signal, the control unit 112 sends a power off command to the power off unit 104 and sets a power off time. Then, the USB connector 102 is reconnected to the external USB device. After the reconnection, the operation mode of the USB connector is switched from the original quick charging mode to the general charging mode.

In the embodiment, the computer device 100 further includes a reset unit 116 connected between the control unit 112 and the south bridge chip 110 in series, the reset unit 116 resets the south bridge chip 110. When the USB connector 102 operates at a general charging mode, the control unit 112 controls the first switching unit 106 to switch back to connected to the south bridge chip 110, the external USB device is charged or files are transferred to the external USB device via the reset unit 116, the south bridge chip 110, the first switching unit 106 and the USB connector 102.

In conclusion, since the power off unit 104 controls the power off time of the USB connector 102, the USB connector of the computer device 100 and external USB device is reconnected to switch between a quick charging mode and a general charging mode in a power on state instead of plugging in and out manually.

Figure 2:
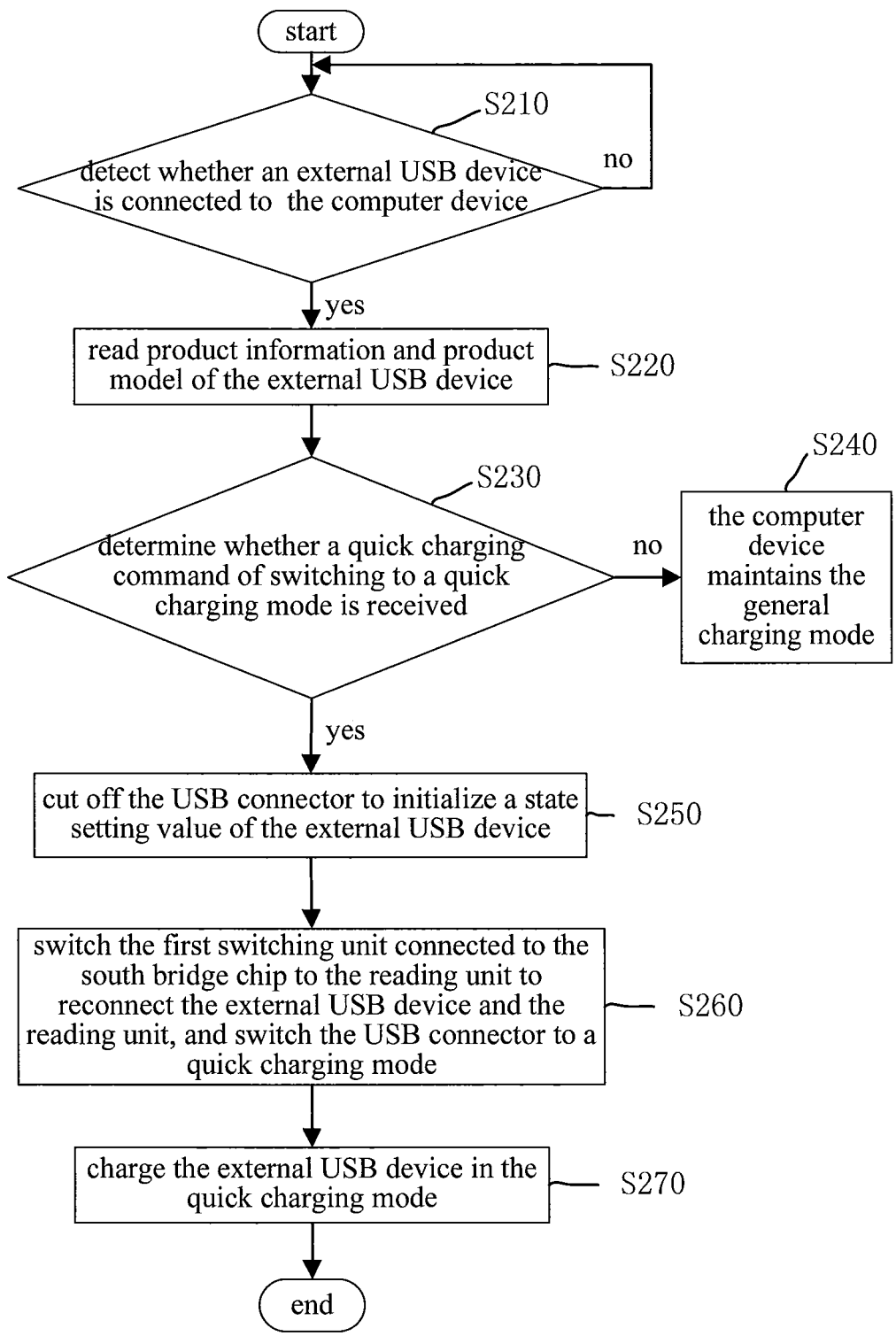
FIG. 2 is a flow chart diagram showing a method of switching operation modes of a USB connector in a first embodiment.

FIG. 2 is a flow chart diagram showing a method of switching operation modes of a USB connector in a first embodiment. The method of switching operation modes in this embodiment is adapted to the computer device 100 in FIG. 1, and the computer device 100 is in a power on state (the S0 state).

First, in step S210, the reading unit 108 detects whether an external USB device is connected to the USB connector 102 of the computer device 100. When the external USB device is not detected, keep executing step 210. Step 220 is then executed when the external USB device is detected. In the embodiment, the external USB device can be a smart phone, and the computer device 100 can be a notebook computer or a motherboard, which is not limited herein.

Second, in step S220, the reading unit 108 reads product information and product model of the external USB device. The reading unit 108 compares the product information and the product model with the charging log file stored in the computer device 100 via the control unit 112, and whether the external USB device can be charged in a quick charging mode is further determined.

In step S230, the charging control unit 114 determines whether a quick charging command of switching to a quick charging mode is received, when not, step S240 is then executed, and the computer device 100 maintains in the general charging mode. When the external USB device is charged in a quick charging mode, and the charging control unit 114 receives the command of switching to a quick charging mode, then step S250 to S270 are executed. In addition, a quick charging command is selected via a user interface of software, and the signal of quick charging commands is transmitted to the charging control unit 114 via the user interface.

In step S250, the control unit 112 controls the power off unit 104 to send a power off command to the USB connector 102 and sets a power off time to initialize a state setting value of the external USB device. In step S260, the control unit 112 controls the first switching unit 106 to switch from the south bridge chip 110 to the reading unit 108 to reconnect the external USB device and the USB connector 102. After the reconnection, the USB connector switches to a quick charging mode. In the step S270, the USB connector charges the external USB device in a quick charging mode.

The conventional computer device with a USB connector cannot charge the external USB device and update BIOS via the external USB device simultaneously. However, in the following embodiment, the computer device updates security BIOS (BIOS with a security access mechanism) as well as charges the external USB device in a quick charging mode.

Figure 3:
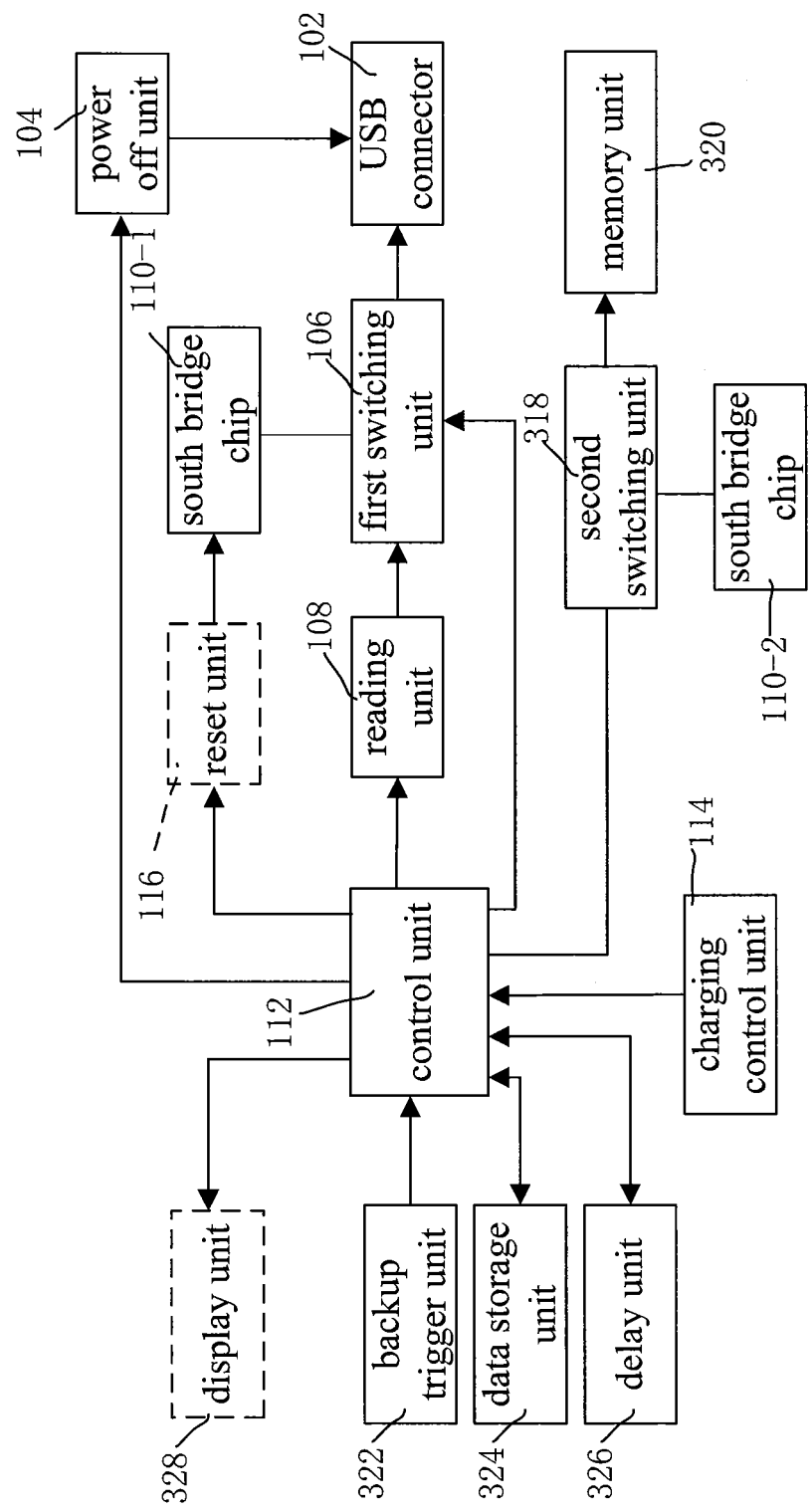
FIG. 3 is a block diagram showing a computer device in a second embodiment.

FIG. 3 is a block diagram showing a computer device in a second embodiment. In the embodiment, except for a USB connector 102, a power off unit 104, a first switching unit 106, a reading unit 108, a south bridge chip 110 (110-1, 110-2), a control unit 112, a charging control unit 114 and a reset unit 116, the computer device 300 further includes a second switching unit 318, a memory unit 320, a backup trigger unit 322, a data storage unit 324 and a delay unit 326. The south bridge chip 110-1 connected to the first switching unit 106 and the south bridge chip 110-2 connected to the second switching unit 318 are a same chip, which only represents different connecting pins.

The second switching unit 318 can make the south bridge chip 110-2 connect to the memory unit 320 or make the control unit 112 connect to the memory unit 320. The second switching unit 318 can be a switching unit of the Serial Peripheral Interface (SPI) which is connected to the south bridge chip 110-2 or the control unit 112 through the SM.

The memory unit 320 (such as a flash memory) stores the BIOS of the computer device 300. When user presses the power button of the computer device 300 to boot the computer device 300, the computer device 300 loads the BIOS stored in the memory unit 320 to execute a Power On Self Test (POST).

The backup trigger unit 322 receives a backup trigger signal of booting a BIOS updating mode. The backup trigger unit 322 can be a button on the motherboard of the computer device 300, which is not limited herein. When the button is pressed, the backup trigger unit 322 sends a signal to the control unit 112 to inform the control unit 112 to enter a BIOS updating mode.

The data storage unit 324 may be an electrically erasable programmable read only memory (EEPROM) which is used to store software and/or hardware information relating to the computer device 300. In an embodiment, the data storage unit 324 includes various parameters of the memory unit 320 and USB driving values, which is not limited herein.

The delay unit 326 delays the reading time of the reading unit 108 reading the external USB device, which can avoid a reading failure due to a reason that the reading unit 108 reads the external USB device in a NOT READY state.

Figure 4:
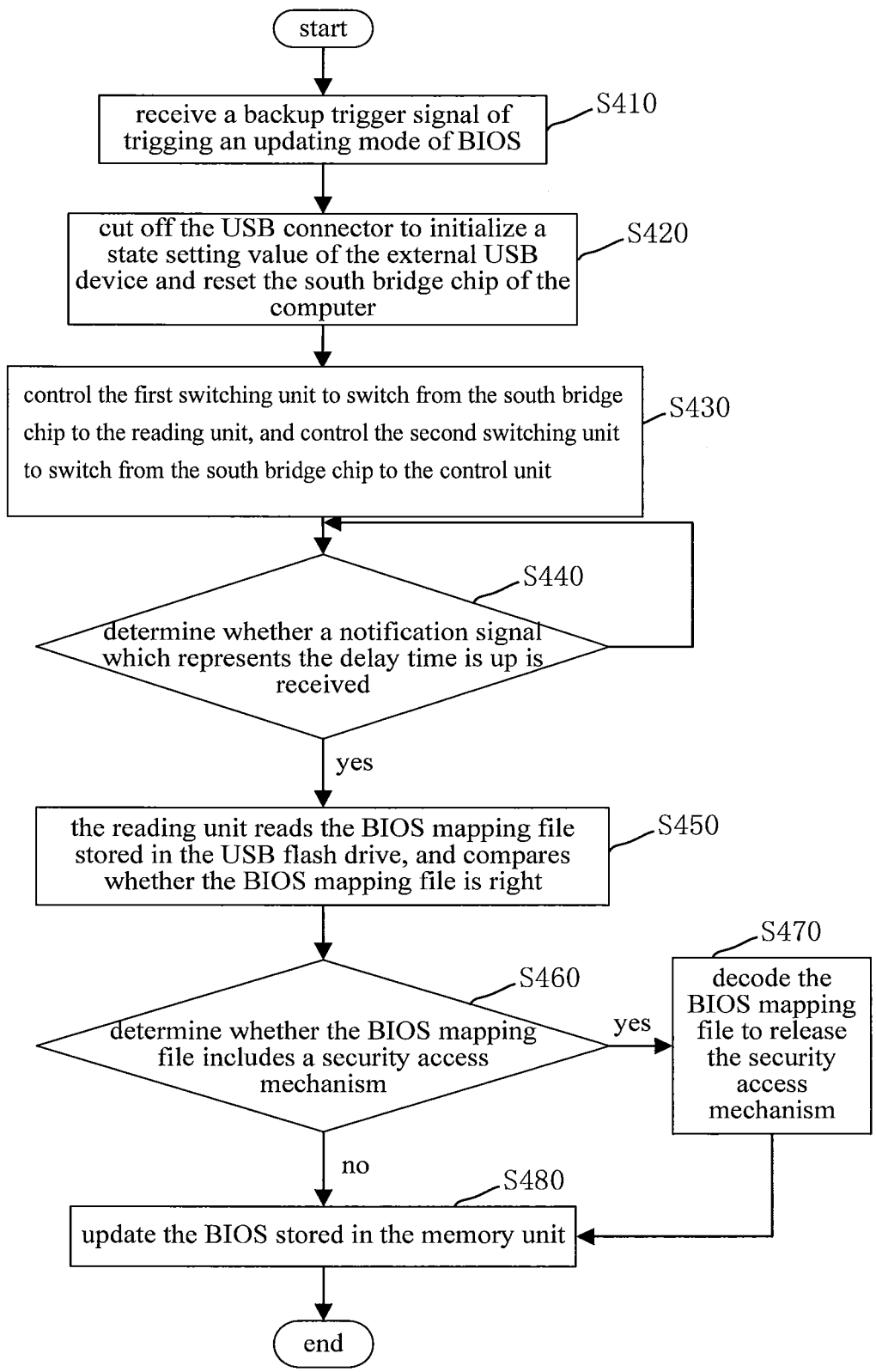
FIG. 4 is a flow chart diagram showing a method of switching operation modes of a USB connector in a second embodiment.

FIG. 4 is a flow chart diagram showing a method of switching operation modes of a USB connector in a second embodiment. The method of switching operation modes in this embodiment is adapted to the computer device 300 in FIG. 3. The computer device 300 is used to connect to the external USB device. In the embodiment, the computer device 300 is a notebook computer, and the external USB device is a USB flash drive. In addition, the computer device 300 can be any electronic device with a motherboard such as a desktop, a notebook, a workstation or a server, which is not limited herein. Furthermore, the external USB device in the embodiment is not limited to a USB flash drive. Please refer to FIG. 3 and FIG. 4 at the same time.

In step S410, the backup trigger unit 322 receives a backup trigger signal of triggering a BIOS updating mode, and sends signal to inform the control unit 112 to enter a BIOS updating mode.

In step S420, after the control unit 112 receives a notification signal of the backup trigger unit 322, it controls the power off unit 104 to send a power off command to the USB connector 102 and sets a power off time to initialize a state setting value of the USB flash drive. Furthermore, the control unit 112 controls the reset unit 116 to reset the south bridge chip 110-1.

In step S430, the control unit 112 sends a control signal controls the first switching unit 106 to switch from the south bridge chip 110-1 to the reading unit 108, and the control unit 112 also controls the second switching unit 318 to switch from the south bridge chip 110-2 to the control unit 112 and wait a delay time. In detail, the control unit 112 determines the required delay time of the delay unit 326 according to the state of the USB flash drive. The delay unit 326 is used to delay the time of the reading unit 108 reading the internal information of the external USB device. The reading unit 108 reads the internal information of the USB flash drive after the delay time is up.

Consequently, in step S440, the control unit 112 determines whether a notification signal is received from the delay unit 326, and the notification signal represents the delay time is up. Step S450 is executed when the notification signal is received.

In step S450, the control unit 112 controls the reading unit 108 to read the BIOS image file stored in the USB flash drive, and compares whether the BIOS image file is right. The method of comparing whether the BIOS image file is right includes comparing the BIOS image file with the relating information and BIOS information stored in the data storage unit 324, the BIOS information stored in the memory unit 320. Whether the BIOS image file stored in the USB flash drive is the updatable version for the computer device 300 is determined according to the information stored in the data storage unit 324 and the memory unit 320. When the BIOS image file is the updatable version for the computer device 300, the BIOS image file is right. Accordingly, the problem of the computer device 300 due to an updating failure can be avoided.

Figure 5:
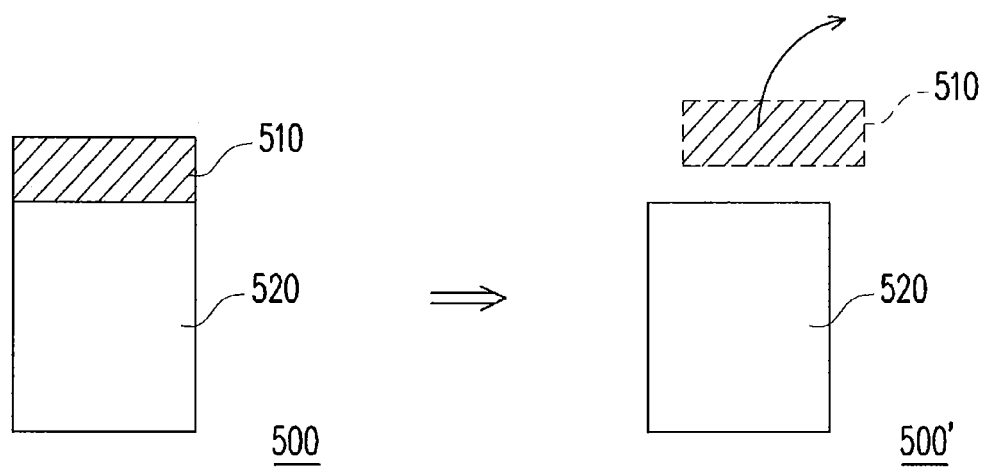
FIG. 5 (a) is a schematic diagram showing a BIOS image file with a security access mechanism in an embodiment.

Step S460 is executed after the BIOS image file of the USB flash drive is determined to be the updatable version for the computer device 300. The control unit 112 determines whether the BIOS image file includes a security access mechanism. As shown in FIG. 5 (a), FIG. 5 (a) is a schematic diagram showing a BIOS image file with a security access mechanism in an embodiment. For example, the BIOS image file 500 with a security access mechanism includes a data block 510 and a data block 520. The data block 520 includes the BIOS data which is known by people skilled in the art, and the file is about 8M. The product key of an operation system is conventionally written into the data block 510.

When the BIOS image file of the USB flash drive includes a security access mechanism is determined by the control unit 112, step S470 is executed, and the BIOS image file is decoded and the security access mechanism is then released. FIG. 5 (b) is a schematic diagram showing that a security access mechanism is released from a BIOS image file in an embodiment. As shown in FIG. 5 (b), the BIOS image file with the data block 510 and the data block 520 cannot update the BIOS. Thus, the product key stored in the data block 510 is first determined by the control unit 112, and the control unit 112 removes the data block 510 of the BIOS image file and updates the BIOS according to the BIOS information stored in the data block 520. When the product key is not determined, the BIOS stored in the memory unit 320 cannot be updated by the control unit 112 of the computer device 300. The protection mechanism disclosed above protects the BIOS of the computer device 300 from being invaded or tampered by a hacker.

Finally, in step S480, the computer device 300 updates the BIOS stored in the memory unit 320 with the BIOS image file of which the security access mechanism is already released. The computer device 300 in the embodiment can be updated by the BIOS image file stored in the USB flash drive, and the security access mechanism of the BIOS image file is already released.

Figure 6:
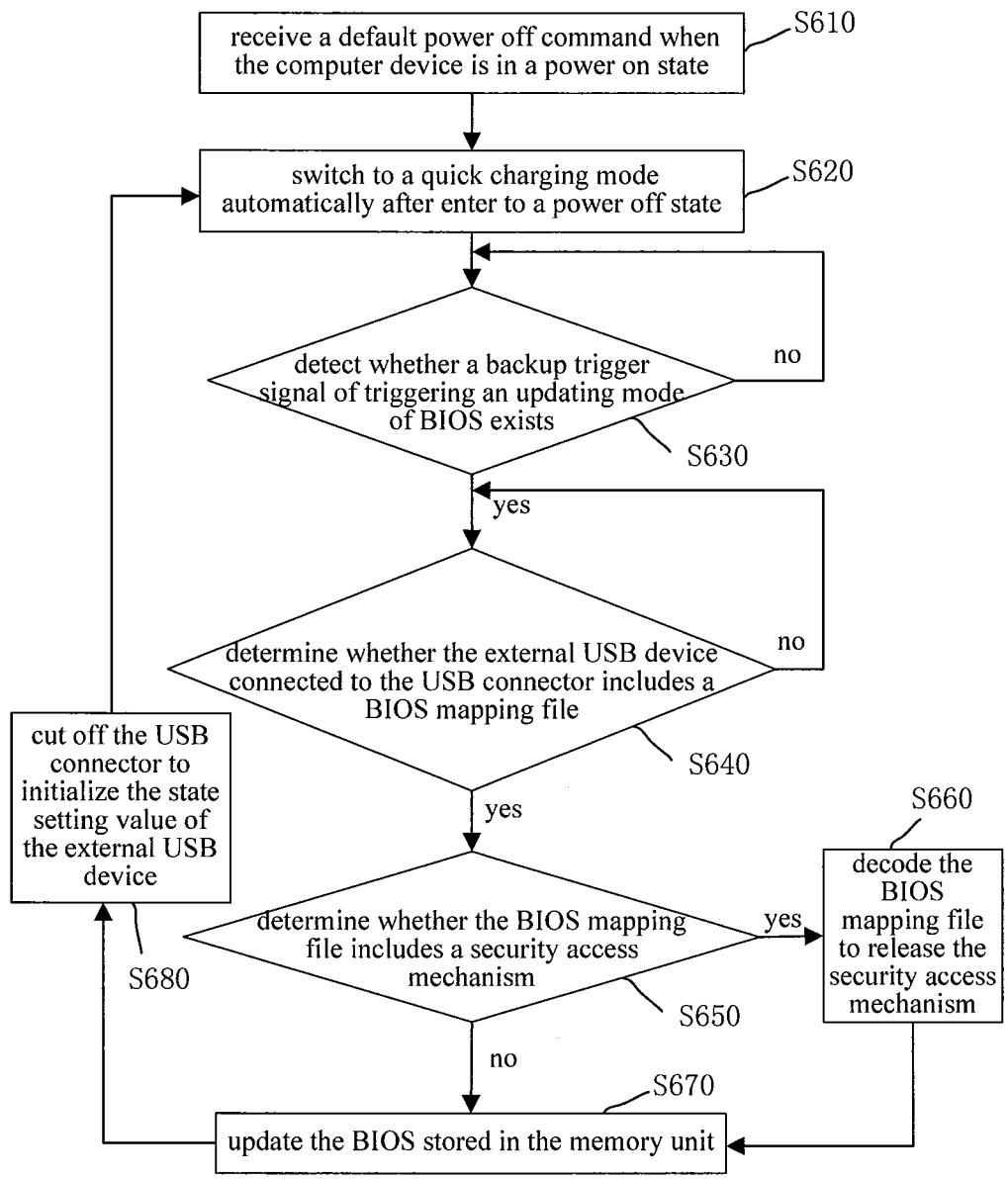
FIG. 6 is a flow chart diagram showing a method of switching operation modes of a USB connector in a third embodiment.

FIG. 6 is a flow chart diagram showing a method of switching operation modes of a USB connector, so as to further illustrate the detail of the modes that switching between a quick charging mode and the BIOS updating mode in the powered off state (S5). The method of switching operation modes in this embodiment is adapted to the computer device 300 in FIG. 3. Please refer to FIG. 3 and FIG. 6 at the same time.

In step S610, when the computer device 300 is in a power on state (such as the state S0), the charging control unit 114 is used to receive a default power off command. The default power off command sets the computer device 300 to switch to a quick charging mode automatically when it enters a power off state (such as the state S5). The default power off command can be set via a user interface of software. In other words, users can decide whether the computer device 300 is maintained in a general charging mode or in a quick charging mode when it enters into a power off state.

In step S620, after entering to a power off state, the computer device 300 switches automatically into a quick charging mode, which is already described above and will be omitted herein.

In step S630, the backup trigger unit 322 detects whether a backup trigger signal for triggering a BIOS updating mode exists.

When the backup trigger unit 322 receives the backup trigger signal, then in step S640, the reading unit 108 determines whether the external USB device connected to the USB connector 102 includes a BIOS image file.

When yes, step S650 is then executed, the control unit 112 determines whether the BIOS image file stored in the external USB device includes a security access mechanism.

When yes, step S660 is executed, the BIOS image file is decoded to release the security access mechanism.

In step S670, the computer device 300 updates the BIOS stored in the memory unit 320 with the BIOS image file of which the security access mechanism is released. Finally, step S680 is executed after the BIOS is updated, the control unit 112 controls the power off unit 104 to send a power off command to the USB connector 102 and sets a power off time to initialize the state setting value of the external USB device and recover the state to the quick charging mode.

Additionally, when any updating failure event is occurred during the process of updating BIOS, the computer device 300 enters to a retrying stage. When the number of retry reaches a retry threshold value, the computer device 300 enters an updating failure state directly; otherwise, the updating is kept retry. When the computer device 300 finishes the BIOS updating and passes a validation, the update is completed, and the quick charging mode is recovered. The computer device 300 in the embodiment further includes a display unit 328, and the display unit 328 is used to display information while updating.

On the other hand, when the computer device 300 is in a power on state and charges the external USB device in a quick charging mode, the charging control unit 114 can detect a charging current and detect whether the charge of the external USB device is finished. The charging current and the charging result can be displayed on the display unit 328 via the control unit 112.

In conclusion, via the power off unit, the computer device in embodiments can control the power off time of the USB connector in a power on state. The computer device 100 can be reconnected to the external USB device without manually plugging the external USB device in to and out of the computer device 100, and then it can switch between a quick charging mode and a general charging mode. Furthermore, the computer device not only includes a quick charging function to charge the external USB device, it also can update via a BIOS image file with a security access mechanism stored in the external USB device. Even if the computer device is in a power off state, the switch between a quick charging mode and a BIOS updating mode can be achieved, and it also does not need the plug in and out operations in the processing of switching. As a result, the steps of operating the computer device are simplified, and the function of the computer device with a USB connector is expanded.

Although the present disclosure has been described in considerable detail with reference to certain embodiments thereof, the disclosure is not limiting. Persons having ordinary skill in the art may make various modifications and changes without departing from the scope of the disclosure. Therefore, the scope of the appended claims should not be limited to the description of the embodiments described above.

What is claimed is:

1. A computer device comprising:
   a universal serial bus (USB) connector connected to an external USB device, wherein the USB connector provides a quick charging mode or a general charging mode;
   a power controller connected to the USB connector;
   a first switch connected to the USB connector, wherein the first switch switches between a south bridge chip and a reader;

a controller connected to the power controller, the first switch, the south bridge chip and the reader, wherein the controller is configured to transmit a control signal; and a charging controller connected to the controller, configured to transmit a quick charging command or a general charging command;

wherein:

when the controller receives the quick charging command, the power controller cuts off power to the USB connector and the USB connector is operated at the quick charging mode by switching the first switch; and when the controller receives the general charging command, the power controller cuts off the power to the USB connector and the USB connector is operated at the general charging mode by switching the first switch.

2. The computer device according to claim 1, wherein: when the USB connector operated at the quick charging mode:

the controller controls the first switch to switch to the reader; and the USB connector charges the external USB device in the quick charging mode.

3. The computer device according to claim 1, wherein: when the USB connector is operated at the general charging mode:

the controller controls the first switch to switch to the south bridge chip; and the USB connector charges the external USB device in the general charging mode and is used to transfer data.

4. The computer device according to claim 1, wherein: when the computer device is in a power on state:

the charging controller receives the quick charging command via a user interface; and the computer device is switched from the general charging mode to the quick charging mode;

wherein the charging controller is further capable of receiving a default power off command from the user interface, the default power off command commands the computer device to enter a power off state and the computer device automatically switches to the quick charging mode.

5. The computer device according to claim 1, wherein: when the computer device is in a power off state, the USB connector maintains in the quick charging mode.

6. The computer device according to claim 1, wherein the first switch is a USB switch which is connected to the south bridge chip or the reader through a USB interface.

7. The computer device according to claim 1, wherein the computer device further includes:

a delay unit connected to the controller;

a backup trigger unit connected to the controller and used for receiving a backup trigger signal; and a second switch connected to a memory and switching between the south bridge chip and the controller.

8. The computer device according to claim 7, wherein: after the backup trigger unit receives the backup trigger signal, wherein the backup trigger signal signals starting a BIOS updating mode:

the controller controls the power controller to cut off the power to the USB connector and controls the second switch to switch from the south bridge chip to the controller;

the delay unit delays a reading time of the reader reading the external USB device; and the reader reads a BIOS image file stored in the external USB device to update a BIOS stored in the memory after a delay time is up.

9. The computer device according to claim 1, wherein: the computer device further includes a data storage connected to the controller and storing information relating to the computer device.

10. The computer device according to claim 9, wherein: after the reader reads the BIOS image file stored in the external USB device:

the controller compares the BIOS image file with the information stored in the data storage and the BIOS stored in a memory to determine whether the BIOS image file is an updatable version for the computer device.

11. The computer device according to claim 10, wherein: the controller determines whether the BIOS image file includes a security access mechanism; and when the BIOS image file includes the security access mechanisms:

the controller decodes the BIOS image file to release the security access mechanism; and the BIOS is updated according to the BIOS image file of which the security access mechanism is released.

12. The computer device according to claim 11, wherein the second switch is a Serial Peripheral Interface (SPI) switching unit which is connected to the south bridge chip or the controller through an SPI.

13. The computer device according to claim 10, wherein the computer device further includes a display connected to the controller, the display displays charging information in a charging process or displays update information of the BIOS during the updating process.

14. A method of switching operation modes of a universal serial bus (USB) connector, adapted to a computer device, wherein:

the computer device includes:

a USB connector;

a first switch connected to the USB connector; and a second switch connected to a memory;

wherein:

the USB connector is connected to an external USB device, the first switch switches between a south bridge chip and a read; and the second switch switches between the south bridge chip and a controller; and the method of switching operation modes includes:

receiving a backup trigger signal of starting a BIOS updating mode;

cutting off power to the USB connector to initialize a state setting value of the external USB device and reset the south bridge chip of the computer device;

delaying a reading time of the reader reading internal information of the external USB device;

waiting a delay time after switching the first switch connected to the south bridge chip to the reader and switching the second switch connected to the south bridge chip to the controller;

determining whether a notification signal of the delay time is up is received;

reading a BIOS image file stored in the external USB device by the reader and determining whether the BIOS image file is an updatable version for the computer device if the notification signal is received; and updating a BIOS stored in the memory.

15. The method of switching operation modes of the USB connector according to claim 14, wherein:
the computer device further comprises a data storage connected to the controller; and
the data storage stores information relating to the computer device.

16. The method of switching operation modes of the USB connector according to claim 14, wherein:
determining whether the BIOS image file is the updatable version for the computer device further includes comparing the BIOS image file with the information stored in the data storage and the BIOS stored in the memory to determine whether the BIOS image file is the updatable version for the computer device.

17. The method of switching operation modes of the USB connector according to claim 14, further comprising:
determining whether the BIOS image file includes a security access mechanism;
updating via the BIOS image file directly when the BIOS image file does not include the security access mechanism; and
decoding the BIOS image file to release the security access mechanism when the BIOS image file includes the security access mechanism and updating the BIOS stored in the memory.

18. The method of switching operation modes of the USB connector according to claim 14, wherein:
the computer device further includes a display; and
the method of switching operation modes further includes displaying updating information on the display during updating the BIOS.

19. A method of switching operation modes of a USB connector, adapted to a computer device, wherein:
the computer device includes the USB connector;
a first switch connected to the USB connector; and
a second switch connected to a memory;
wherein:
the USB connector adapted to be connected to an external USB device;
the first switch switches between a south bridge chip and a reader; and
the second switch switches between the south bridge chip and a controller;
the method comprising:
receiving a default power off command when the computer device is in a power on state, wherein the default power off command switches the computer device automatically to a quick charging mode after the computer device enters a power off state;
detecting a backup trigger signal used for starting a BIOS updating mode when the computer device is switched to the quick charging mode;
determining whether the external USB device connected to the USB connector includes a BIOS image file; and
updating a BIOS of the computer device according to the BIOS image file when the external USB device includes the BIOS image file.

20. The method of switching operation modes of the USB connector according to claim 19, wherein the computer device receives the default power off command from a user interface.

21. The method of switching operation modes of the USB connector according to claim 19, wherein the method of switching operation modes further includes:
determining whether the BIOS image file stored in the external USB device includes a security access mechanism;
updating the BIOS via the BIOS image file directly when the BIOS image file does not include the security access mechanism; and
decoding the BIOS image file to release the security access mechanism and updating the BIOS via the BIOS image file of which the security access mechanism is released when the BIOS image file includes the security access mechanism.

22. The method of switching operation modes of the USB connector according to claim 19, further comprising:
determining whether the BIOS of the computer device updates successfully;
cutting off the USB connector to initialize a state setting value of the external USB device when the BIOS of the computer device updates successfully; and
recovering the computer device to the quick charging mode to quickly charge the external USB device.

* * * * *